United States Patent
Chao et al.

(10) Patent No.: US 10,721,212 B2
(45) Date of Patent: Jul. 21, 2020

(54) NETWORK POLICY UPDATE WITH OPERATIONAL TECHNOLOGY

(71) Applicant: General Electric Company, Schenectady, NY (US)

(72) Inventors: Armel Chao, Vancouver (CA); Roderick Locke, Vancouver (CA)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 15/799,850

(22) Filed: Oct. 31, 2017

(65) Prior Publication Data
US 2018/0176186 A1 Jun. 21, 2018

Related U.S. Application Data

(60) Provisional application No. 62/436,253, filed on Dec. 19, 2016.

(51) Int. Cl.
*H04L 29/06* (2006.01)
*H04L 12/24* (2006.01)
*H04L 12/26* (2006.01)

(52) U.S. Cl.
CPC .......... *H04L 63/0263* (2013.01); *H04L 41/06* (2013.01); *H04L 63/101* (2013.01);
(Continued)

(58) Field of Classification Search
CPC ... H04L 63/0263; H04L 41/06; H04L 63/101; H04L 63/1408; H04L 63/1425; H04L 63/20; H04L 43/062; H04L 63/10
(Continued)

(56) References Cited

U.S. PATENT DOCUMENTS 6,529,998 B1 * 3/2003 Yochai ............... G06F 12/0862
711/137
7,421,498 B2 * 9/2008 Packer ............... G06F 16/9535
709/225

(Continued)

FOREIGN PATENT DOCUMENTS

CN 106209843 A * 12/2016

OTHER PUBLICATIONS

Modbus, Modbus Application Protocol Specification, Apr. 26, 2012, V1.1b3, 50 pages (Year: 2012).*

*Primary Examiner* — Shahriar Zarrineh
(74) *Attorney, Agent, or Firm* — Fitch, Even, Tabin & Flannery LLP

(57) ABSTRACT

A network security system monitors data traffic being transmitted between a first device and a second device in a network to identify a plurality of commands being transmitted between the first device and the second device. The network security system then generates a whitelisting policy based on the plurality of commands being transmitted between the first device and the second device. After generating the whitelisting policy, the network security system receives subsequent data traffic being transmitted between the first device and the second device, and determines, based on the subsequent data traffic, a first command being transmitted between the first device and the second device. In response to determining that the first command is not included in the whitelisting policy, the network security system generates an alert in relation to the first command.

18 Claims, 8 Drawing Sheets

(52) U.S. Cl.
CPC ...... *H04L 63/1408* (2013.01); *H04L 63/1425* (2013.01); *H04L 63/20* (2013.01); *H04L 43/062* (2013.01); *H04L 63/10* (2013.01)

(58) Field of Classification Search
USPC .......................................................... 726/1
See application file for complete search history.

(56) References Cited

U.S. PATENT DOCUMENTS

| | | | | |
|---|---|---|---|---|
| 7,849,507 | B1* | 12/2010 | Bloch | H04L 29/12066 726/22 |
| 8,176,554 | B1* | 5/2012 | Kennedy | H04L 63/145 726/23 |
| 8,204,984 | B1* | 6/2012 | Aziz | H04L 63/0227 709/224 |
| 8,891,546 | B1* | 11/2014 | Frenkel | H04L 63/1441 370/419 |
| 8,990,944 | B1* | 3/2015 | Singh | G06F 21/56 726/24 |
| 9,071,576 | B1* | 6/2015 | Earl | H04L 63/0236 |
| 9,245,147 | B1* | 1/2016 | Williams | G06F 21/55 |
| 9,369,431 | B1* | 6/2016 | Kirby | H04L 63/02 |
| 9,389,993 | B1* | 7/2016 | Okmyanskiy | G06F 16/00 |
| 9,483,186 | B1* | 11/2016 | Lewis | G06F 3/061 |
| 9,654,482 | B2* | 5/2017 | Gagliano | H04L 63/108 |
| 9,716,637 | B1* | 7/2017 | Baker | H04L 43/065 |
| 9,779,222 | B2* | 10/2017 | Borkar | G06F 21/10 |
| 10,038,613 | B1* | 7/2018 | Shkolnikov | H04L 41/5067 |
| 10,079,854 | B1* | 9/2018 | Scott | H04L 67/02 |
| 10,162,967 | B1* | 12/2018 | Oliver | G06F 21/57 |
| 10,218,725 | B2* | 2/2019 | Kim | H04L 63/1458 |
| 2005/0251804 | A1* | 11/2005 | Musta | G06F 9/542 718/100 |
| 2006/0123083 | A1* | 6/2006 | Goutte | G06Q 10/107 709/206 |
| 2008/0022378 | A1* | 1/2008 | Repasi | G06F 21/51 726/5 |
| 2008/0168558 | A1* | 7/2008 | Kratzer | G06F 21/55 726/23 |
| 2008/0255782 | A1* | 10/2008 | Bilac | G06Q 50/06 702/62 |
| 2009/0019469 | A1* | 1/2009 | Foti | H04L 63/0263 725/27 |
| 2009/0083852 | A1* | 3/2009 | Kuo | G06F 21/564 726/22 |
| 2009/0158430 | A1* | 6/2009 | Borders | G06F 21/552 726/23 |
| 2010/0313264 | A1* | 12/2010 | Xie | H04L 63/101 726/22 |
| 2012/0005755 | A1* | 1/2012 | Kitazawa | G06F 21/56 726/24 |
| 2012/0192273 | A1* | 7/2012 | Turbin | G06F 21/56 726/23 |
| 2013/0086237 | A1* | 4/2013 | Cutler | H04L 41/0893 709/223 |
| 2013/0097708 | A1* | 4/2013 | Jayanthi | G06F 21/554 726/25 |
| 2013/0111024 | A1* | 5/2013 | Setia | H04L 67/02 709/225 |
| 2013/0111591 | A1* | 5/2013 | Topan | G06F 21/563 726/24 |
| 2013/0291085 | A1* | 10/2013 | Chong | G05B 19/048 726/10 |
| 2015/0067764 | A1* | 3/2015 | Kim | H04L 63/0227 726/1 |
| 2015/0152124 | A1* | 6/2015 | Mori | A61K 31/53 428/457 |
| 2015/0180890 | A1* | 6/2015 | Ronen | H04L 63/1416 726/23 |
| 2015/0237002 | A1* | 8/2015 | Baniqued | H04L 61/2007 709/220 |
| 2015/0381642 | A1* | 12/2015 | Kim | H04L 69/329 726/23 |
| 2017/0013017 | A1* | 1/2017 | Chen | H04L 63/20 |
| 2017/0078321 | A1* | 3/2017 | Maylor | H04L 63/1433 |
| 2017/0177908 | A1* | 6/2017 | Roper | G06F 3/061 |
| 2017/0181070 | A1* | 6/2017 | Gupta | H04W 28/08 |
| 2017/0201619 | A1* | 7/2017 | Cohen | H04M 1/6075 |
| 2017/0279717 | A1* | 9/2017 | Bethers | H04L 45/748 |
| 2017/0318352 | A1* | 11/2017 | Penke | H04N 21/6125 |
| 2018/0052914 | A1* | 2/2018 | Allen | G06F 17/2211 |
| 2019/0068643 | A1* | 2/2019 | Locke | H04L 63/20 |
| 2019/0190777 | A1* | 6/2019 | Uchizumi | H04L 12/66 |
| 2019/0197830 | A1* | 6/2019 | Petersen | G07F 17/3251 |

* cited by examiner

500

MONITOR DATA TRAFFIC BEING TRANSMITTED BETWEEN A FIRST DEVICE AND A SECOND DEVICE TO IDENTIFY A PLURALITY OF COMMANDS
502

GENERATE A WHITELISTING POLICY BASED ON THE PLURALITY OF COMMANDS
504

DETECT A WHITELISTING POLICY VIOLATION
506

GENERATE AN ALERT IN RESPONSE TO THE DETECTED WHITELISTING POLICY VIOLATION
508

FIG. 5

NETWORK POLICY UPDATE WITH OPERATIONAL TECHNOLOGY

CROSS-REFERENCE TO RELATED APPLICATIONS

The present application claims the benefit of priority of U.S. Provisional Application No. 62/436,253, filed on Dec. 19, 2016, which is incorporated herein by reference in its entirety.

TECHNICAL FIELD

The present disclosure generally relates to the technical field of special-purpose machines that facilitate network security, including computerized variants of such special-purpose machines and improvements thereto, and to the technologies by which such special-purpose machines become improved compared to other special-purpose machines that facilitate network security. In particular, the present disclosure addresses systems and methods for network security policy configuration.

BACKGROUND

Most people are familiar with the term Information Technology (IT), which covers the spectrum of technologies for information processing, including software, hardware, communications technologies and related services. Operation Technology (OT) applies IT concepts to hardware and software that detects or causes a change through the direct monitoring and/or control of physical devices, processes and events in the enterprise. For example, OT networks interconnect industrial control systems such as programmable logic controllers, supervisory control and data acquisition systems, distributed control systems, process control domains, safety instrumented systems, and building management and automation systems.

The Industrial Internet is a huge new opportunity for growth and efficiency. To realize this value, OT environments need to be connected. With production systems becoming more interconnected, the exposure to cyber incidents increases. Attacks and disruptions on critical infrastructure put reputation, production, people, and profits at risk.

Traditionally, OT networks have operated separately from IT networks. For example, OT networks utilized proprietary protocols optimized for the required functions, some of which have become adopted as 'standard' industrial communications protocols (e.g., DNP3, Modbus, Profibus, RTU, CANBUS, HART, DeviceNet). More recently, IT-standard network protocols are being implemented in OT devices and systems to reduce complexity and increase compatibility with more traditional IT hardware TCP/IP). This has led to a demonstrable reduction in security for OT systems.

Network security systems are designed to protect critical infrastructure, control systems and OT assets. Network security systems provide protection from cyber threats and vulnerabilities in OT environments by monitoring and blocking malicious activity and misconfiguration to promote OT safety and protect productivity. While effective, configuring a network security system is a difficult and time intensive manual task. For example, a network administrator is often tasked with manually generating whitelist policies that identify commands that should be allowed within the network. This requires the network administrator to analyze the software services running on the devices in the network and determine the commands that are likely to be transmitted to provide the software services. Accordingly, improvements are needed.

BRIEF DESCRIPTION OF THE DRAWINGS

The drawings illustrate example embodiments of the present disclosure and do not limit the scope of the present disclosure.

FIG. 5 is a flowchart illustrating a method for generating whitelisting policies, according to an example embodiment.

DETAILED DESCRIPTION

Figure 1:
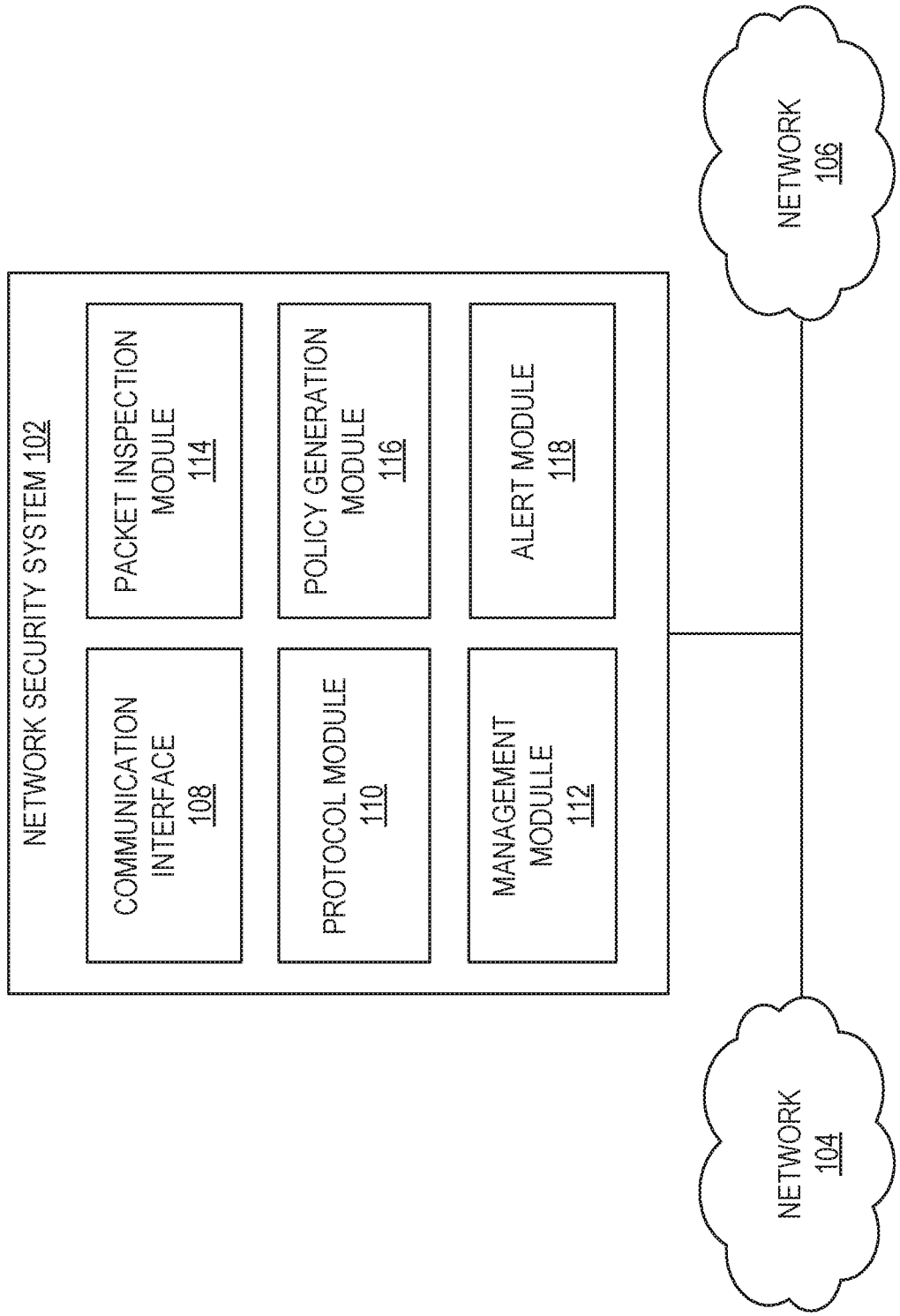
FIG. 1 is a block diagram of a network security system, according to some example embodiments.

Network security systems, such as network firewalls, network security devices, etc., establish a barrier between a trusted secure network and an outside network (e.g., the Internet) that is assumed to be unsecure or untrusted. The network security system monitors and controls incoming and outgoing network traffic between the secured network and the outside network based on a set of predetermined security policies (e.g., rules). For example, a network security system includes a packet inspection engine that analyzes incoming and outgoing data packets based on the set of predetermined security policies. The network security system forwards approved data packets towards their intended destination, while blocking data packets that are not approved.

One example policy used by a network security system is a whitelisting policy. A whitelisting policy includes a list or register that identifies data traffic that should be allowed to pass to its intended recipient. For example, a whitelisting policy identifies data packets that should be allowed based on a source and/or destination computing node, source and/or destination IP address, application-layer commands, etc. Whitelisting policies are generally generated by a network administrator that manually adds individual commands to the list or register. This process is time consuming and requires constant updating as the administrator identifies additional commands to add to the list.

To alleviate this issue, a network security system generates a whitelisting policy based on monitored data traffic. The network security system initially monitors data traffic between devices in the network for a period of time. For example, the devices in the network are executed in a sandboxed testing environment for a period of time during which the devices communicate with each other to provide a set of software services. The network security system monitors the data traffic during this period of time and gathers network data describing a plurality of commands transmitted between the devices as well as metadata describing the individual commands (e.g., source IP, destination IP, command type, time, etc.). The network security system then generates a whitelisting policy based on the plurality of commands transmitted between the devices. For example, the network security system adds each of the commands to the whitelisting policy.

The network security system uses the generated whitelisting policy to determine which data packets should be allowed to pass to their intended recipient. To further alleviate the burden of manually updating the whitelisting policy, the network security system generates alert messages when data traffic received by the network security system includes commands that are not listed in the whitelisting policies. The network security system transmits the alerts messages to administrators or other authorized users.

An alert message includes data describing the received command as well as any other desired data describing the command, such as the destination IP, source IP, etc. The alert message also includes a proposed modification to the whitelisting policy that the recipient may accept if desired. For example, the proposed modification may include adding the identified command to the whitelisting policy, modifying the range of an existing whitelisting policy, etc. In response to receiving an authorization of the proposed modification to the whitelisting policy, the network security system updated the whitelisting policy according to the proposed modification.

The following figures describe example embodiments, example environments of example embodiments, and example aspects thereof.

FIG. 1 is a block diagram of a network security system 102, according to some example embodiments. To avoid obscuring the inventive subject matter with unnecessary detail, various functional components (e.g., modules) that are not germane to conveying an understanding of the inventive subject matter have been omitted from FIG. 1. However, a skilled artisan will readily recognize that various additional functional components may be supported by the network security system 102 to facilitate additional functionality that is not specifically described herein. Furthermore, the various functional modules depicted in FIG. 1 may reside on a single computing device (e.g., a network security device) or may be distributed across several computing devices in various arrangements such as those used in cloud-based architectures. Further, the various functional modules, engines, etc., depicted in FIG. 1 may be implemented as either a physical network security device, or, alternatively, a virtual network security device.

As shown, the network security system 102 is connected to both network 104 and network 106. For example, the network security system 102 can be connected to network 104 and network 106 via a traffic tap, respective inline traffic connections, etc.

Network 104 and network 106 may include both an IT network and an OT network. For example, network 104 and network 106 may include a combination of traditional IT devices (e.g., computer servers, laptops, mobile computing devices, etc.), and OT devices (e.g., industrial machinery, valves, pumps, etc.).

The network security system 102 establishes a barrier between a trusted secure network (i.e., network 104) and an outside network (e.g., the Internet) that is assumed to be unsecure or entrusted (i.e., network 106). To accomplish this, the network security system 102 monitors and controls incoming and outgoing network traffic between the secured network 104 and the outside network 106 based on a set of predetermined security rules, policies, etc.

As shown, the network security system 102 includes a communication interface 108, a protocol module 110, a management module 112, a packet inspection module 114, a policy generation module 116, and an alert module 118.

The communication interface 108 includes physical and/or software components to read traffic from and send traffic to both the network 104 and the network 106. For example, the communication interface 108 receives a communication, such as a request, data, etc., from a computing device in network communication with the network security system 102 and passes the communication along to an appropriate module of the network security system 102. The communication interface 108 also sends a communication to another computing device in network communication with the network security system 102. For example, the communication interface 108 receives communications from a device in network 104 that is intended for a recipient device in network 106, and then transmits the received communication to its intended recipient device in network 106.

The protocol module 110 processes read traffic received from device in the networks 104 and 106 to extract commands and responses of an OT protocol such as Modbus, DNP3, IEC 60870, BACnet, LonWorks, EPICS, any other SCADA protocol, and any other OT protocol. The protocol module 110 also processes commands and responses of an OT protocol and generates traffic to send to its intended destination.

The management module 112 controls and monitors the network security system 102. One function of the management module 112 includes implementing network security configurations that define performance of the network security system. For example, the network security configurations include security policies, such as whitelisting policies, that define rules for data traffic that is allowed to pass to its intended recipient. Whitelisting policies includes a list or register that identifies data traffic that should be allowed to pass to its intended recipient. For example, the whitelisting policies identify data packets that should be allowed based on a source and/or destination computing node, IP address, command type, protocol type, etc.

The packet inspection module 114 analyzes data traffic received by the network security system 102 based on the security policies (e.g. rules). In one example, the packet inspection module 114 determines whether data traffic is allowed based on the whitelisting policies. For example, the packet inspection module 114 identifies a destination and source IP address associated with the data packet as well as a command type. The packet inspection module 114 then determines whether the particular data communication is listed in the whitelisting policies, indicating that the data packet should be allowed to continue to its intended recipient.

The packet inspection module 114 may also implement other deep packet inspection techniques where each data packet is dissected into component protocols and filtered based on the security policies. In one example embodiment, a protocol targets a specific controller or group of controllers. For example, in the healthcare industry, the DICOM protocol is used to transport information between medical imaging devices such as MRI machines and workstations or file servers. In one example of a security policy, the packet inspection module 114 blocks or alerts on certain operations such as reading a patient file or CAT scan from a specific workstation to a file server.

Example security policies can be based on a variety of factors, such as an inbound traffic rate, a traffic protocol, a traffic pattern, etc. The packet inspection module 114 may apply a single security policy or multiple security policies to a data packet. Additionally, the security policy or policies may change over time or according to another condition.

An example of a security policy based on a traffic pattern is allowing or blocking data packets based on the source endpoint and/or a destination endpoint of the data traffic. For example, a security policy may allow traffic originating from workstation A (or multiple workstations A) and no other endpoints, only the traffic reaching workstation B (or multiple workstations B) and no other endpoints, or both. Other example security policies are based on a URI, content (a word or phrase), a user's IP address, a user's MAC address, etc.

The policy generation module 116 generates whitelisting policies based on monitored network traffic data. The policy generation module 116 initially monitors data traffic transmitted between devices in networks 104 and 106 for a period of time. For example, the devices in the networks 104 and 106 are executed in a sandboxed testing environment for a period of time during which the devices communicate with each other to provide a set of software services. The policy generation module 116 monitors the data traffic during the period of time and gathers network data that describes commands transmitted between the devices as well as metadata describing the individual commands (e.g., source IP, destination IP, command type, time, etc.). The policy generation module 116 then generates a whitelisting policy based on the commands that were transmitted between the devices. For example, the policy generation module 116 may generate a whitelisting policy that includes each of the identified commands transmitted between the devices. As a result, the network security system 102 would allow the identified commands to pass through to their intended recipient. As another example, the policy generation module 116 may include limitations on the identified commands based on the associated metadata. For example, the policy generation module 116 may generate a whitelisting policy that allows the commands between the identified devices, identified source and destination IP addresses, during specified time periods, etc.

The alert module 118 executes a remedial action in response to a violation of a policy. Example remedial actions include blocking network traffic, transmitting an alert message to a user for user intervention, as well as a proposing a modification to the whitelisting policy. A proposed modification to the whitelisting policy may be generated by the policy generation module 116 based on the violating data traffic. The user may include an administrator or other authorized user associated with the network security system 102. To transmit the alert message to the user, the alert module 118 transmits the alert message to a client device (e.g., computer, laptop, smartphone, etc.) of the user. For example, the alert module 118 transmits the alert message as a push notification, email, etc. The user may select to authorize or deny the proposed modification to the whitelisting policy, causing the user's client device to transmit a corresponding authorization or denial message. In response to receiving an authorization message, the network security system 102 implements the proposed modification to the whitelisting policy.

Figure 2:
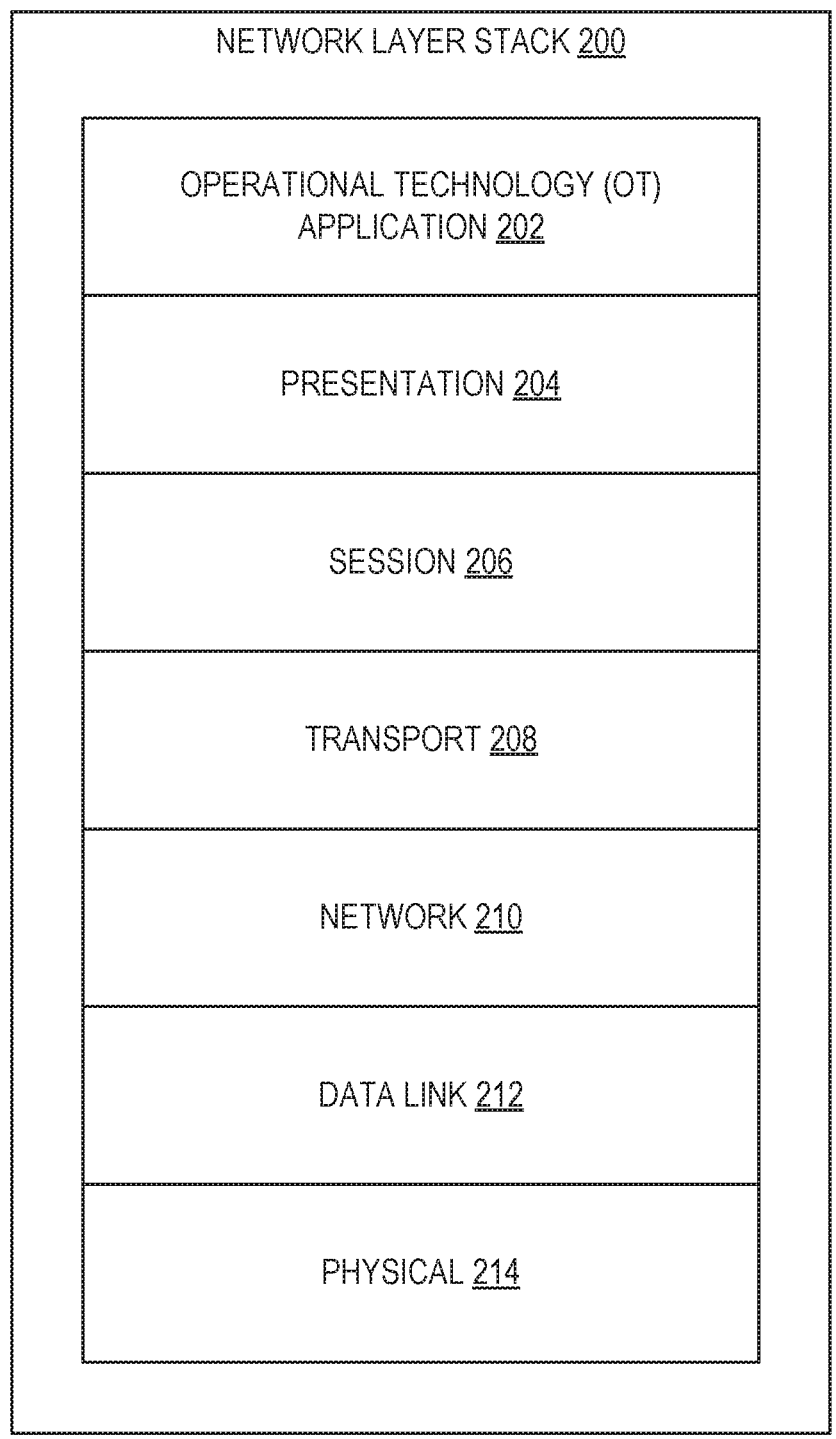
FIG. 2 is a diagram of a network layer stack, according to some example embodiments.

FIG. 2 is a diagram of a network layer stack 200, according to some example embodiments. The layers in the network layer stack 200 include an OT application layer 202, a presentation layer 204, a session layer 206, a transport layer 208, a network layer 210, a data link layer 212, and a physical layer 214. An example OT protocol borrows some aspects from an IT protocol, but modifies others. For example, the health care Digital imaging and Communications in Medicine (DICOM) protocol uses a network stack with Ethernet, Internet Protocol, Transmission Control Protocol, and DICOM layers.

Figure 3:
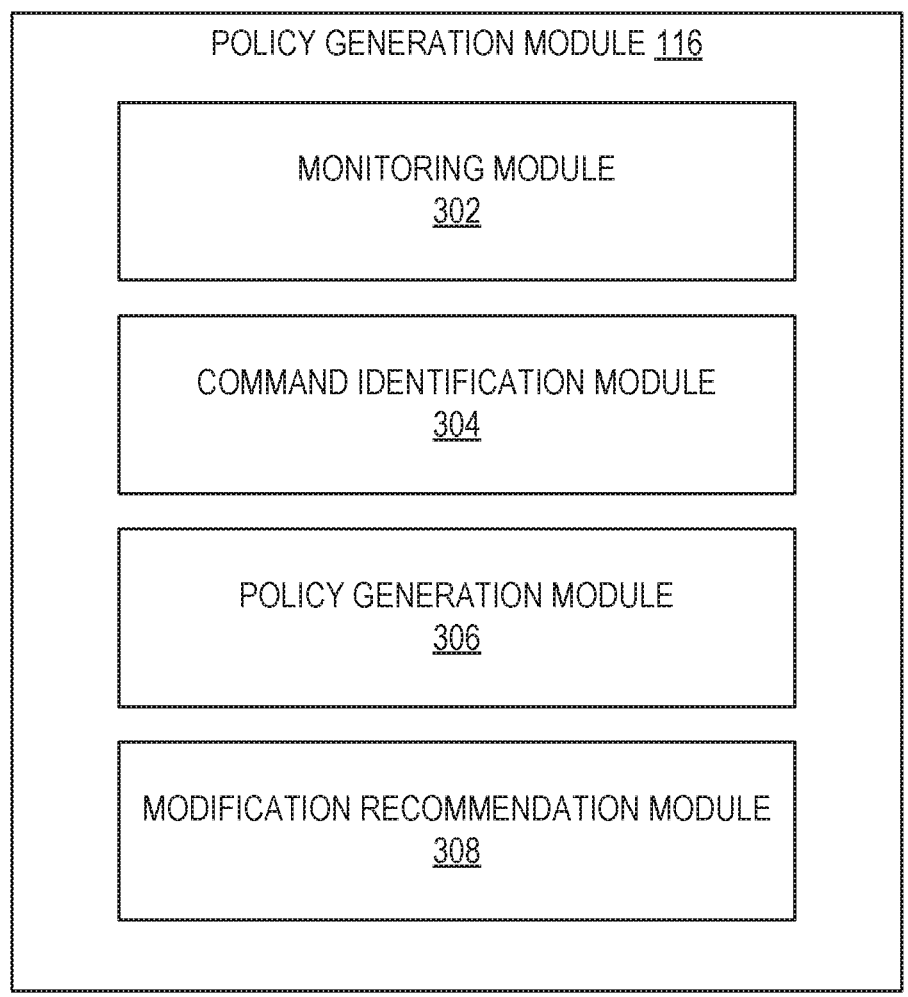
FIG. 3 is a block diagram of a policy generation module, according to some example embodiments.

FIG. 3 is a block diagram of the policy generation module 116, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the policy generation module 116 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the policy generation module 116 includes a monitoring module 302, a command identification module 304, a policy generation module 306, and a modification recommendation module 308.

The monitoring module 302 monitors network traffic and generates monitored network data. Network traffic includes data packets transmitted from devices in both networks 104 and 106. The data packets are transmitted as the devices communicate with each other to provide services, such as software services. For example, the data packets represent commands transmitted from one device to another device, such as read, write or administer commands.

The monitoring module 302 analyzes the data packets as they are received at the network security system 102 and generates monitored network data describing the data packets. The monitoring module 302 gathers data from the data packets and records the data to generate the monitored network data. For example, the monitoring module 302 gathers data such as a source IP, destination IP, protocol, timestamp, device IDs, etc., from each command and records the gathered data.

In some embodiments the monitoring module 302 monitors network traffic during a period of time. For example, the monitoring module 302 monitors network traffic during a period time during which the devices are executing in a sandboxed testing environment. During the period of time, the network security system 102 may allow all received data packets to pass to their intended destination without restriction. For example, the network security system 102 allows the data packets to be transmitted to their intended recipient without restriction based on a set of security policies.

The command identification module 304 identifies commands from the monitored network data. For example, the command identification module 304 parses the monitored network data to extract the command code (e.g., protocol and/or function calls) by removing additional data such as included parameters, variables, etc. In some embodiments, the command identification module 304 uses a listing of known commands to identify the command code in the monitored network data. For example, the command identification module 304 searches the monitored network data for command code that matches commands listed in the listing of known commands. The listing of known commands may further identify a format of the commands that allows the command identification module 304 to parse additional data, such as the parameters and variables, to extract the command code.

The policy generation module 306 generates a whitelisting policy based on the identified commands from the monitored network data. For example, the policy generation module 306 adds the identified commands to the whitelisting policy. As a result, the network security system 102 will allow those commands to pass to their intended recipient.

As another example, the policy generation module 306 generates a whitelisting policy that includes additional conditions that allow a subset of the commands to pass to their intended recipient. For example, the conditions can include time based conditions, source and/or destination IP address conditions, etc. As a result, the whitelisting policy would allow a listed command to pass to its intended recipient if the associated conditions are met (e.g., during a specified time period, transmitted by a source IP address in a specified range, etc.).

The policy generation module 306 uses metadata associated with the commands, such as source and destination IP address, time, source and/or destination device, etc., to determine conditions to place on the whitelisting policies. For example, the policy generation module 306 uses the earliest time at which a command was transmitted and the latest time at which the command was transmitted to determine a time based condition for the command (e.g., the command is allowed during a period of time spanning from the earliest time to the latest time at which the command was transmitted). As another example, the policy generation module 306 uses the source 1P addresses that transmitted a command to place a condition such as an allowed source IP address range or a listing of source IP addresses that are allowed to transmit the command.

The modification recommendation module 308 generates a proposed modification to the whitelisting policy based on a detected policy violation by the packet inspection module 114. This can include detecting a policy violation to a whitelisting policy generated by the policy generation module 306 and/or a policy generated an administrator or other user. The packet inspection module 114 detects a policy violation when a command received by the network security system 102 is not included in the whitelisting policy. In this situation, the modification recommendation module 308 generates a proposed modification to the whitelisting policy based on the received command. For example, the proposed modification to the whitelisting policy may be to simply add the command to the whitelisting policy.

As another example, the proposed modification to the whitelisting policy may include modifying an existing whitelisting policy by adjusting the conditions associated with a whitelisting policy. For example, in response to receiving a command at a time that is outside of a time period condition associated with a whitelisting policy, the modification recommendation module 308 may generate a proposed modification to the whitelisting policy to expand the time condition based on the time at which the command was received. As another example, in response to receiving a command from a source IP address that outside of a source IP address range associated with a whitelisting policy, the modification recommendation module 308 may generate a proposed modification to the whitelisting policy to expand the source IP address range based on source IP address of the received command.

Figure 4:
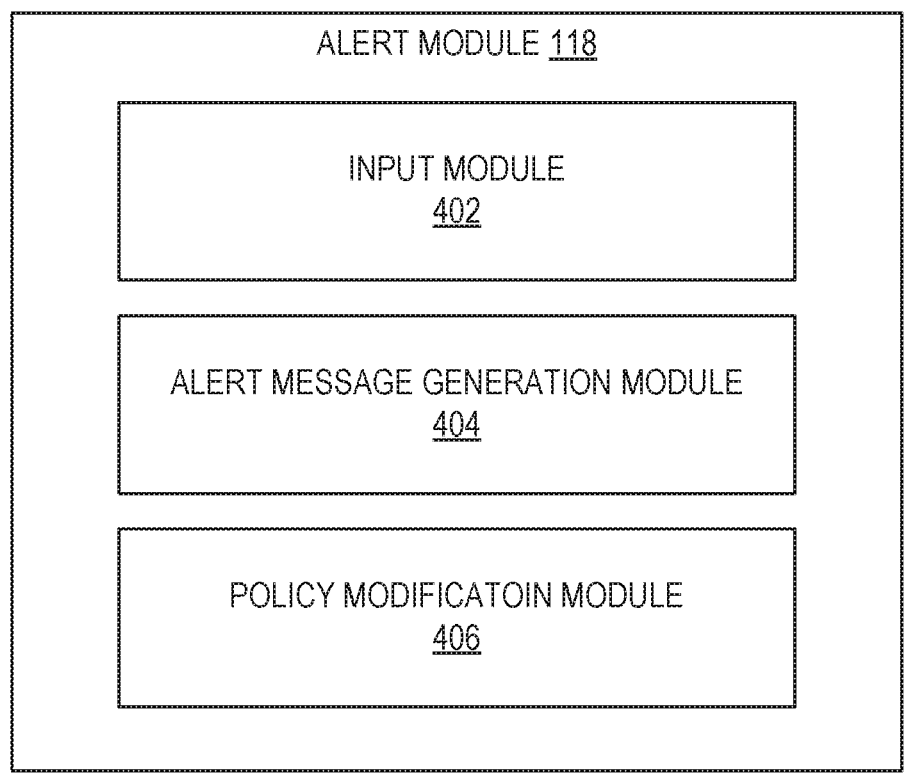
FIG. 4 is a block diagram of an alert module, according to some example embodiments.

FIG. 4 is a block diagram of the alert module 118, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the alert module 118 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the alert module 118 includes an input module 402, an alert message generation module 404, and a policy modification module 406.

The input module 402 receives a notification that a whitelisting policy has been violated. For example, the packet inspection module 114 notifies the alert module 118 in response to determining that received data traffic includes a command that is not included in the whitelisting policy or that does not meet the conditions associated with the whitelisting policy. The notification may include data describing the whitelisting policy violation, such as data identifying the received commands as well as the time the command was received, the source and/or destination IP address, source and/or destination device, etc.

The alert message generation module 404 generates and transmits an alert message in response to a detected whitelisting policy violation. An alert message is a message indicating that the whitelisting policy violation has occurred. For example, the alert message may include data describing the whitelisting policy violation, such as the command that was received, the time, the source and/or destination IP address, etc. The alert message generation module 404 transmits the generated alert message to a user that is an administrator or other authorized user of the network security system. For example, the alert message generation module 404 transmits the alert message to a client device of the user.

In some embodiments, the alert message enables the recipient user to authorize or deny the whitelisting policy violation. Authorization of the whitelisting violation would cause the network security system 102 to allow the data traffic to pass through to its intended recipient. In contrast, a denial of the whitelisting policy violation would cause the data traffic to be blocked.

In some embodiments, the alert message includes a proposed modification to the whitelisting policy. For example, the alert message generation module 404 communicates with the modification recommendation module 308 to obtain the proposed modification to the whitelisting policy. The receiving use can select to authorize or deny the proposed modification to the whitelisting policy.

The policy modification module 406 causes an authorized proposed modification to the whitelisting policy to be implemented. For example, the policy modification module 406 updates the whitelisting policies to implement the proposed modification to the whitelisting policy. This includes adding new commands to the whitelisting policy, as well as modifying conditions associated with existing commands in the whitelisting policy.

FIG. 5 is a flowchart illustrating a method 500 for generating whitelisting policies, according to an example embodiment. The method 500 may be embodied in computer-readable instructions for execution by one or more computer processors such that the operations of the method 500 may be performed in part or in whole by the network security system 102; accordingly, the method 500 is described below by way of example with reference thereto. However, it shall be appreciated that at least some of the operations of the method 500 may be deployed on various other hardware configurations and the method 500 is not intended to be limited to the network security system 102.

At operation 502, the monitoring module 302 monitors data being transmitted between a first device and a second device to identify a plurality of commands. The monitoring module 302 monitors network traffic and generates monitored network data. Network traffic includes data packets transmitted from devices in both networks 104 and 106. The data packets are transmitted as the devices communicate with each other to provide services, such as software services. For example, the data packets represent commands transmitted from one device to another device, such as read, write or administer commands.

The monitoring module 302 analyzes the data packets as they are received at the network security system 102 and generates monitored network data describing the data packets. The monitoring module 302 gathers data from the data packets and records the data to generate the monitored network data. For example, the monitoring module 302 gathers data such as a source IP, destination IP, protocol, timestamp, device Ms, etc., from each command and records the gathered data.

In some example embodiments, the monitoring module 302 monitors network traffic during a period of time. For example, the monitoring module 302 monitors network traffic during a period time during which the devices are executing in a sandboxed testing environment. During the period of time, the network security system 102 may allow all received data packets to pass to their intended destination without restriction. For example, the network security system 102 allows the data packets to be transmitted to their intended recipient without restriction based on a set of security policies.

At operation 504, the policy generation module 306 generates a whitelisting policy based on the plurality of commands. The plurality of commands is identified from the monitored network data. The policy generation module 306 adds the identified commands to the whitelisting policy. As a result, the network security system 102 will allow those commands to pass to their intended recipient.

As another example, the policy generation module 306 generates a whitelisting policy that includes additional conditions that allow a subset of the commands to pass to their intended recipient. For example, the conditions can include time based conditions, source and/or destination IP address conditions, etc. As a result, the whitelisting policy allows a listed command to pass to its intended recipient if the associated conditions are met (e.g., during a specified time period, transmitted by a source IP address in a specified range, etc.).

The policy generation module 306 uses metadata associated with the commands, such as a source and destination IP address, time, source and/or destination device, etc., to determine conditions to place on the whitelisting policies. For example, the policy generation module 306 uses the earliest time at which a command was transmitted and the latest time at which the command was transmitted to determine a time-based condition for the command (e.g., the command is allowed during a period of time spanning from the earliest time to the latest time at which the command was transmitted). As another example, the policy generation module 306 uses the source 1P addresses that transmitted a command to place a condition such as an allowed source IP address range or a listing of source IP addresses that are allowed to transmit the command.

At operation 506, the packet inspection module 114 detects a whitelisting policy violation. The packet inspection module 114 analyzes data traffic received by the network security system 102 based on whitelisting policies. For example, the packet inspection module 114 identifies a destination and source IP address associated with the data packet as well as a command type. The packet inspection module 114 then determines whether the particular data communication is listed in the whitelisting policies, indicating that the data packet should be allowed to continue to its intended recipient. A whitelisting policy violation is detected when a received command is not included in the whitelisting policy or an associated condition is not met.

At operation 508, the alert message generation module 404 generates an alert in response to the detected whitelisting policy violation. An alert message is a message indicating that the whitelisting policy violation has occurred. For example, the alert message may include data describing the whitelisting policy violation, such as the command that was received, the time, the source and/or destination IP address, etc. The alert message generation module 404 transmits the generated alert message to a user that is an administrator or other authorized user of the network security system. For example, the alert message generation module 404 transmits the alert message to a client device of the user.

In some embodiments, the alert message enables the recipient user to authorize of deny the whitelisting policy violation. Authorization of the whitelisting violation would cause the network security system 102 to allow the data traffic to pass through to its intended recipient. In contrast, a denial of the whitelisting policy violation would cause the data traffic to be blocked.

Figure 6:
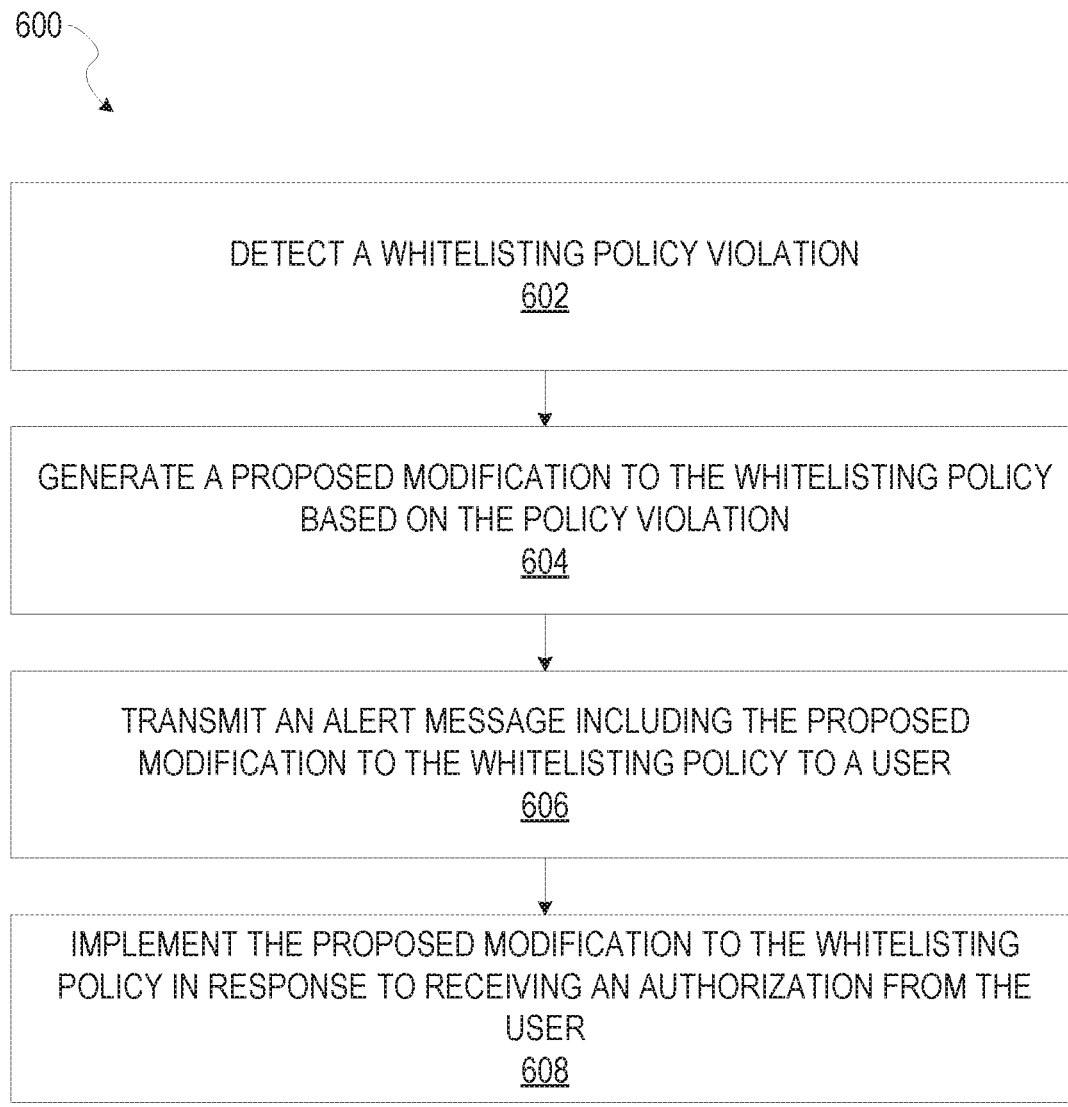
FIG. 6 is a flowchart illustrating a method for modifying a whitelisting policy, according to an example embodiment.

FIG. 6 is a flowchart illustrating a method 600 for modifying a whitelisting policy, according to an example embodiment. The method 600 may be embodied in computer-readable instructions for execution by one or more computer processors such that the operations of the method 600 may be performed in part or in whole by the network security system 102; accordingly, the method 600 is described below by way of example with reference thereto. However, it shall be appreciated that at least some of the operations of the method 600 may be deployed on various other hardware configurations and the method 600 is not intended to be limited to the network security system 102.

The packet inspection module 114, as shown at operation 602, detects a whitelisting policy violation. The packet inspection module 114 analyzes data traffic received by the network security system 102 based on whitelisting policies. For example, the packet inspection module 114 identifies a destination and source IP address associated with the data packet as well as a command type. The packet inspection module 114 then determines whether the particular data communication is listed in the whitelisting policies, indicating that the data packet should be allowed to continue to its intended recipient. A whitelisting policy violation is detected when a received command is not included in the whitelisting policy or an associated condition is not met.

At operation 604, the modification recommendation module 308 generates a proposed modification to the whitelisting policy based on the policy violation, such as generating a proposed modification based on the received command. For example, the proposed modification to the whitelisting policy may be to simply add the command to the whitelisting policy.

As another example, the proposed modification to the whitelisting policy may include modifying an existing whitelisting policy by adjusting the conditions associated with a whitelisting policy. For example, in response to receiving a command at a time that is outside of a time period condition associated with a whitelisting policy, the modification recommendation module 308 may generate a proposed modification to the whitelisting policy to expand the time condition based on the time at which the command was received. As another example, in response to receiving a command from a source IP address that outside of a source IP address range associated with a whiten sting policy, the modification recommendation module 308 may generate a proposed modification to the whitelisting policy to expand the source IP address range based on source IP address of the received command.

At operation 606, the alert message generation module 404 transmits an alert message including the proposed modification to the whitelisting policy to a user. An alert message is a message indicating that the whitelisting policy violation has occurred. For example, the alert message may include data describing the whitelisting policy violation, such as the command that was received, the time, the source and/or destination IP address, etc. The alert message generation module 404 transmits the generated alert message to a user that is an administrator or other authorized user of the network security system. For example, the alert message generation module 404 transmits the alert message to a client device of the user.

The alert message includes the proposed modification to the whitelisting policy. For example, the alert message generation module 404 communicates with the modification recommendation module 308 to obtain the proposed modification to the whitelisting policy. The receiving user can select to authorize or deny the proposed modification to the whitelisting policy. For example, the alert message enables the recipient user to authorize of deny the proposed modification to the whitelisting policy.

As shown at operation 608, the policy modification module 406 implements the proposed modification to the whitelisting policy in response to receiving an authorization from the user. For example, the policy modification module 406 updates the whitelisting policies to implement the proposed modification to the whitelisting policy. This includes adding new commands to the whitelisting policy, as well as modifying conditions associated with existing commands in the whitelisting policy.

Example Software Architecture

Figure 7:
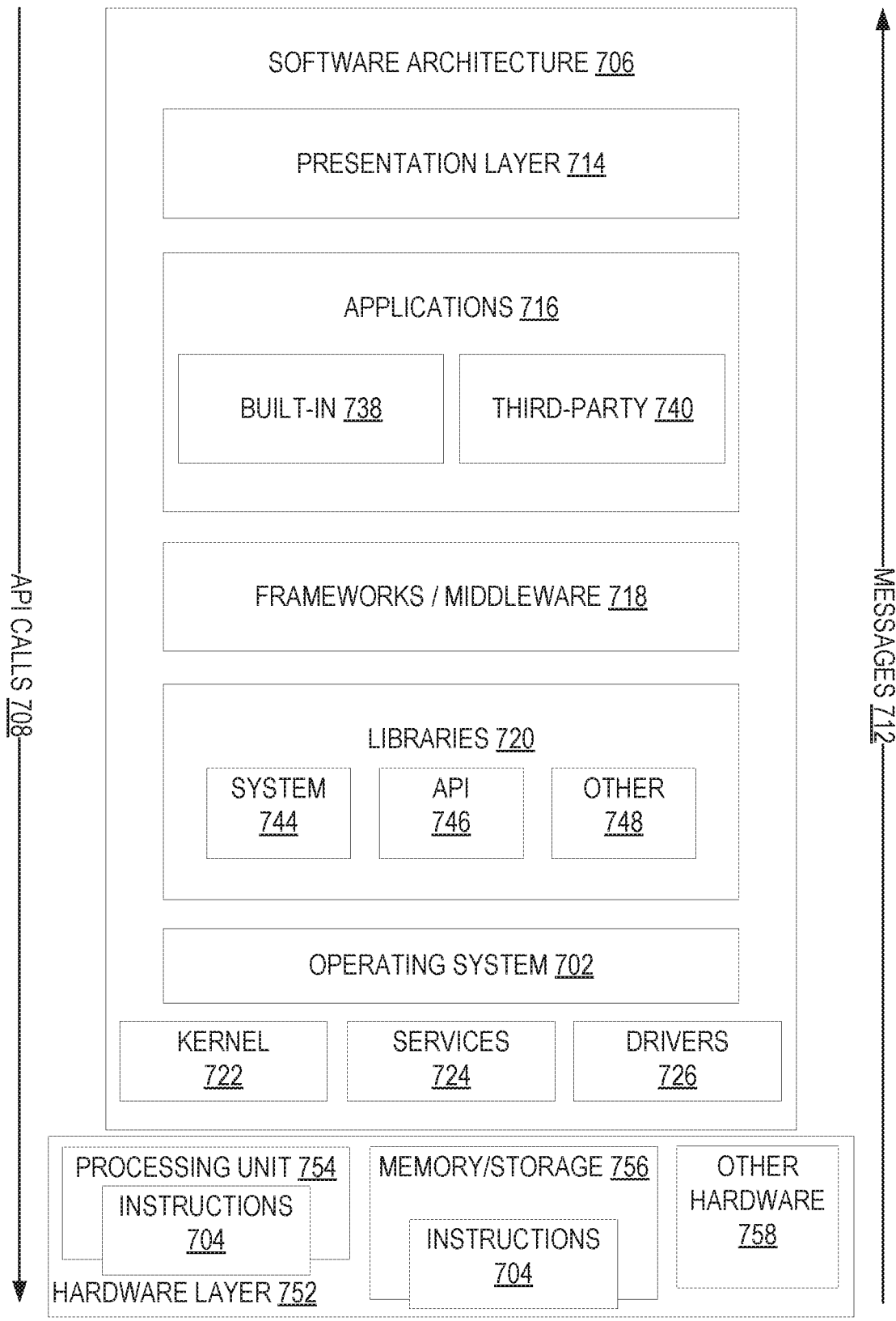
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 800 of FIG. 8 that includes, among other things, processors 804, memory 814, and I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, applications 716 and a presentation layer 714. Operationally, the applications 716 and/or other components within the layers may invoke Application Programming Interface (API) calls 708 through the software stack and receive a response 712 as in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 may include display drivers, camera drivers, Bluetooth®® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as presentation layer 714. In these systems, the application/component "logic" can be separated from the aspects of the application/component that interact with a user.

Example Machine Architecture and Machine-Readable Medium

Figure 8:
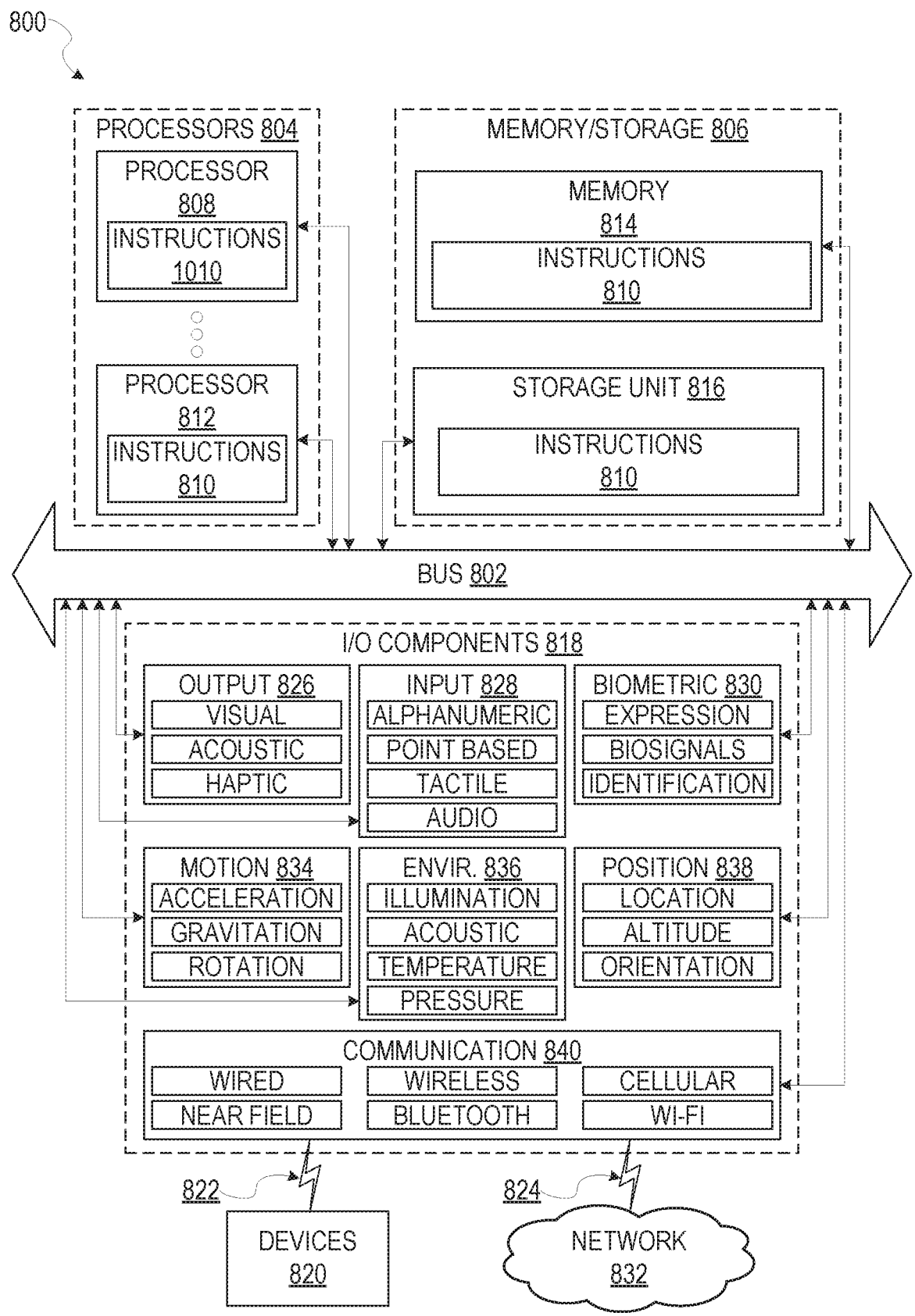
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 822 and coupling 824, respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via IP geo-location, location via Wi-Fi® signal triangulation, location via detecting a NFC beacon signal that may indicate a particular location, and so forth.

Transmission Medium

In various example embodiments, one or more portions of the network 832 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 832 or a portion of the network 832 may include a wireless or cellular network and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 810 may be transmitted or received over the network 832 using a transmission medium via a network interface device (e.g., a network interface component included in the communication components 840) and utilizing any one of a number of well-known transfer protocols (e.g., HTTP). Similarly, the instructions 810 may be transmitted or received using a transmission medium via the coupling 822 (e.g., a peer-to-peer coupling) to the devices 820. The term "transmission medium" shall be taken to include any intangible medium that is capable of storing, encoding, or carrying the instructions 810 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject flatter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   in a testing phase, monitoring data traffic being transmitted between a first device in a first network and a second device in a second network to identify a plurality of commands being transmitted between the first device and the second device;
   wherein the first network is a secure network and the second network is a non-secure network;
   in the testing phase, generating, by at least one hardware processor, a whitelisting policy based on the plurality of commands being transmitted between the first device and the second device, the plurality of commands being all commands that are transmitted between the first device and the second device within a time period during the testing phase;
   wherein each of the plurality of commands conforms to an operation technology (OT) protocol, the OT protocol being a Modbus protocol, a DNP3 protocol, an IEC 60870 protocol, a BACnet protocol, a LonWorks protocol, or an EPICS protocol;
   wherein metadata associated with the plurality of commands is also monitored during the testing phase and includes source IP information, destination IP information, command type information, and time information, wherein the command type is a read command, a write command, or an administer command;
   in an operational phase that is subsequent to the testing phase and after generating the whitelisting policy, receiving subsequent data traffic being transmitted between the first device and the second device;
   wherein the whitelisting policy accepts messages within an address range and from a time range, the address range including a range of source addresses of senders of one of the plurality of commands and the time range identifying when the one of the plurality of commends is received;
   in the operational phase, determining, based on the subsequent data traffic, a first command being transmitted between the first device and the second device; and
   in the operational phase and in response to determining that the first command is in violation of the whitelisting policy, generating an alert in relation to the first command;
   wherein the first command is in violation of the whitelisting policy because the first command was not sent from an address within the address range or the first command is not received during the time range;
   wherein the whitelisting policy is dynamically adjusted by a modification based upon the detected violation of the whitelisting policy, and the modification includes adjusting the address range or the time range;
   generating a first alert message in response to the modification and transmitting the first alert message to a client device associated with an administrator of the first network or the second network, the first alert message describing the modification;
   when an authorization is received from the client device in response to the first alert message, allowing the modification of the whitelist to occur;
   when a denial is received from the client device in response to the first alert message, preventing the modification of the whitelist from occurring.

2. The method of claim 1, wherein generating the alert in relation to the first command comprises:
   parsing the subsequent data traffic to extract at least parameter data associated with the first command, yielding parsed command data describing the first command.

3. The method of claim 2, wherein generating the alert in relation to the first command comprises:
   transmitting a second alert message to a client device associated with an administrator of the network, the second alert message including the parsed command data describing the first command.

4. The method of claim 3, further comprising:
   receiving, from the client device, an authorization of the first command in response to the second alert message; and
   in response to receiving the authorization, allowing the subsequent data traffic to proceed to its intended recipient and updating the whitelisting policies to include the first command.

5. The method of claim 3, further comprising:
   receiving, from the client device, a denial of the first command in response to the second alert message; and blocking the subsequent data traffic.

6. The method of claim 1, wherein the first device and the second device are computing devices that are part of an OT network.

7. A network security system comprising:
   one or more computer processors; and
   one or more non-transitory mediums storing instructions that, when executed by the one or more computer processors, cause the system to perform operations comprising:
   in a testing phase, monitoring data traffic being transmitted between a first device in a first network and a second device in a second network to identify a plurality of commands being transmitted between the first device and the second device;
   wherein the first network is a secure network and the second network is a non-secure network;
   in the testing phase, generating a whitelisting policy based on the plurality of commands being transmitted between the first device and the second device, the plurality of commands being all commands that are transmitted between the first device and the second device within a time period during the testing phase;

wherein the whitelisting policy accepts messages within an address range and from a time range, the address range including a range of source addresses of senders of one of the plurality of commands and the time range identifying when the one of the plurality of commends is received;

wherein each of the plurality of commands conforms to an operation technology (OT) protocol, the OT protocol being a Modbus protocol, a DNP3 protocol, an IEC 60870 protocol, a BACnet protocol, a LonWorks protocol, or an EPICS protocol;

wherein metadata associated with the plurality of commands is also monitored during the testing phase and includes source IP information, destination IP information, command type information, and time information, wherein the command type is a read command, a write command, or an administer command;

in an operational phase that is subsequent to the testing phase and after generating the whitelisting policy, receiving subsequent data traffic being transmitted between the first device and the second device;

in the operational phase, determining, based on the subsequent data traffic, a first command being transmitted between the first device and the second device; and in the operational phase and in response to determining that the first command in violation of the whitelisting policy, generating an alert in relation to the first command;

wherein the first command is in violation of the whitelisting policy because the first command was not sent from an address within the address range or the first command is not received during the time range;

wherein the whitelisting policy is dynamically adjusted by a modification based upon the detected violation of the whitelisting policy, and the modification includes adjusting the address range or the time range;

generating a first alert message in response to the modification and transmitting the first alert message to a client device associated with an administrator of the first network or the second network, the first alert message describing the modification;

when an authorization is received from the client device in response to the first alert message, allowing the modification of the whitelist to occur;

when a denial is received from the client device in response to the first alert message, preventing the modification of the whitelist from occurring.

8. The network security system of claim 7, wherein generating the alert in relation to the first command comprises:
parsing the subsequent data traffic to extract at least parameter data associated with the first command, yielding parsed command data describing the first command.

9. The network security system of claim 8, wherein generating the alert in relation to the first command comprises:
transmitting a second alert message to a client device associated with an administrator of the network, the second alert message including the parsed command data describing the first command.

10. The network security system of claim 9, the operations further comprising:

receiving, from the client device, an authorization of the first command in response to the second alert message; and in response to receiving the authorization, allowing the subsequent data traffic to proceed to its intended recipient and updating the whitelisting policies to include the first command.

11. The network security system of claim 9, the operations further comprising:
receiving, from the client device, a denial of the first command in response to the second alert message; and
blocking the subsequent data traffic.

12. The network security system of claim 7, wherein the first device and the second device are computing devices that are part of an OT network.

13. A non-transitory computer-readable medium storing instructions that, when executed by one or more computer processors of a machine, cause the machine to perform operations comprising:

in a testing phase, monitoring data traffic being transmitted between a first device in a first network and a second device in a second network to identify a plurality of commands being transmitted between the first device and the second device;

wherein the first network is a secure network and the second network is a non-secure network;

in the testing phase, generating a whitelisting policy based on the plurality of commands being transmitted between the first device and the second device, the plurality of commands being all commands that are transmitted between the first device and the second device within a time period during the testing phase;

wherein each of the plurality of commands conforms to an operation technology (OT) protocol, the OT protocol being a Modbus protocol, a DNP3 protocol, an IEC 60870 protocol, a BACnet protocol, a LonWorks protocol, or an EPICS protocol;

wherein metadata associated with the plurality of commands is also monitored during the testing phase and includes source IP information, destination IP information, command type information, and time information, wherein the command type is a read command, a write command, or an administer command;

wherein the whitelisting policy accepts messages within an address range and from a time range, the address range including a range of source addresses of senders of one of the plurality of commands and the time range identifying when the one of the plurality of commends is received;

in an operational phase that is subsequent to the testing phase and after generating the whitelisting policy, receiving subsequent data traffic being transmitted between the first device and the second device;

in the operational phase, determining, based on the subsequent data traffic, a first command being transmitted between the first device and the second device; and in the operational phase and in response to determining that the first command is in violation of the whitelisting policy, generating an alert in relation to the first command;

wherein the first command is in violation of the whitelisting policy because the first command was not sent from an address within the address range or the first command is not received during the time range;

wherein the whitelisting policy is dynamically adjusted by a modification based upon the detected violation of the whitelisting policy, and the modification includes adjusting the address range or the time range;

generating a first alert message in response to the modification and transmitting the first alert message to a client device associated with an administrator of the first network or the second network, the first alert message describing the modification;

when an authorization is received from the client device in response to the first alert message, allowing the modification of the whitelist to occur;

when a denial is received from the client device in response to the first alert message, preventing the modification of the whitelist from occurring.

14. The non-transitory computer-readable medium of claim 13, wherein generating the alert in relation to the first command comprises:

parsing the subsequent data traffic to extract at least parameter data associated with the first command, yielding parsed command data describing the first command.

15. The non-transitory computer-readable medium of claim 14, wherein generating the alert in relation to the first command comprises:

transmitting a second alert message to a client device associated with an administrator of the network, the alert message including the parsed command data describing the first command.

16. The non-transitory computer-readable medium of claim 15, the operations further comprising:

receiving, from the client device, an authorization of the first command in response to the second alert message; and in response to receiving the authorization, allowing the subsequent data traffic to proceed to its intended recipient and updating the whitelisting policies to include the first command.

17. The non-transitory computer-readable medium of claim 15, the operations further comprising:

receiving, from the client device, a denial of the first command in response to the second alert message; and blocking the subsequent data traffic.

18. The non-transitory computer-readable medium of claim 13, wherein the first device and the second device are computing devices that are part of an OT network.

* * * * *